United States Patent
Speer

[19]

[11] Patent Number: 6,131,938
[45] Date of Patent: Oct. 17, 2000

[54] WOBBLE AND RATTLE RESISTANT RECEIVER HITCH

[76] Inventor: William W. Speer, 1323 Eleanor Way, Sunnyvale, Calif. 94087

[21] Appl. No.: 09/073,105

[22] Filed: May 5, 1998

[51] Int. Cl.[7] ............................................ B60D 1/28
[52] U.S. Cl. ................................. 280/506; 24/525
[58] Field of Search ........................ 280/506, 507, 280/491.5; 24/459, 525

[56] References Cited

U.S. PATENT DOCUMENTS

| | | | |
|---|---|---|---|
| 2,674,772 | 4/1954 | Jacobs | 24/525 |
| 3,889,981 | 6/1975 | Westford | 280/507 |
| 4,050,714 | 9/1977 | Epp | 280/495 |
| 4,856,686 | 8/1989 | Workentine | 224/42.07 |
| 5,025,932 | 6/1991 | Jay | 211/20 |
| 5,078,418 | 1/1992 | Kalmanson | 280/506 |
| 5,181,822 | 1/1993 | Allsop et al. | 414/462 |
| 5,244,133 | 9/1993 | Abbott et al. | 224/42.03 |
| 5,333,888 | 8/1994 | Ball | 280/504 |
| 5,344,175 | 9/1994 | Speer | 280/506 |
| 5,449,101 | 9/1995 | VanDusen | 224/506 |
| 5,529,231 | 6/1996 | Burgess | 224/502 |
| 5,593,172 | 1/1997 | Breslin | 280/506 |
| 5,615,904 | 4/1997 | VanDusen et al. | 280/506 |
| 5,664,717 | 9/1997 | Joder | 224/502 |
| 5,735,539 | 4/1998 | Kravitz | 280/506 |

*Primary Examiner*—Kevin Hurley
*Attorney, Agent, or Firm*—Thomas E. Schatzel; Law Offices of Thomas E. Schatzel

[57] ABSTRACT

A receiver-type trailer hitch system embodiment of the present invention comprises a splint assembly with a pair of opposing clamps that simultaneously engage opposite sides of the outer surfaces of an open end of a hitch receiver tube and shank end of a trailer coupling adaptor after being locked into place with a clevis pin. The splint assembly is tightened with a pair of bolts in a vice-like assembly to bring the opposing clamps hard against the hitch receiver tube and the trailer coupling adaptor to eliminate wobble and free-play that would otherwise exist between them.

5 Claims, 2 Drawing Sheets

WOBBLE AND RATTLE RESISTANT RECEIVER HITCH

BACKGROUND OF THE INVENTION

1. Field of the Invention

The present invention generally relates to car and truck receiver hitches for towing and carrying, and more particularly to eliminating undesirable free-play between a receiver insert and its mated hitch tube.

2. Description of the Prior Art

Receiver style trailer hitches come in a variety of capacities for various applications, and are generally classified as either weight-carrying or weight-distributing. The weight-carrying type of hitch is used for trailer weights up to 5,000 lb. and where the weight and suspension of the tow vehicle can accommodate that load. Weight-distributing hitches are normally used for heavier trailers up to 10,000 lb., and when the weight and suspension of the tow vehicle in relation to the trailer weight requires a redistribution of the weight.

Receiver style hitches typically comprise a receiver tube section that is securely attached to a tow vehicle's frame. A ball-mount shank tongue is slipped into the receiver tube and locked in place with a hitch pin. The trailer can then couple and pivot on the ball-mount shank tongue. The ball-mount shank tongue and its adapter are easy to remove and store, and can even be exchanged with others of other sizes, or that carry the ball at different heights, etc. The receiver tube can also receive utility carriers for bikes, skis, cargo, etc. Plumbers and other craftsmen who routinely work from their trucks also commonly attach tool mounts and work platforms to receiver tubes.

Receiver tubes are ordinarily sized slightly larger than necessary to allow the ball-mount shank tongue to be easily installed or removed. This usually means there is free-play, e.g. about 0.030 inch, between the receiver tube and ball-mount shank tongue even after the lock pin is put in place. Such free-play allows the ball-mount shank tongue to move about in the receiver tube during use, e.g., while towing, turning, starting, or stopping, and from wind.

The loose connection of the ball-mount shank tongue can cause rattling and bumping sounds that Eire annoying and distracting to passengers. Sport utility vehicle and van passengers often sit inside the vehicle and very near the hitch connection, where any receiver hitch noise can be even more pronounced.

Tow and carry receiver adapters are now available that allow a user to both mount a bicycle carrier and tow a trailer. A bicycle carrier is welded to a collar piece that telescopes over a ball-mount shank tongue and is firmly seated. The ball-mount shank tongue is then inserted into the receiver tube, secured with a hitch pin, and the trailer to be towed is coupled to the ball-mount shank tongue's hitch ball. The long twisting arm of the bicycle carrier on the loose ball-mount shank tongue can allow the carrier to wobble quite a bit. Prior art article carriers, tool mounts, and work platforms used with receiver style hitches do not incorporate means for eliminating wobble or instability caused by free-play between ball-mount shank tongue and the receiver tube.

An anti-wobble/anti-rattle device is therefore needed that is compatible with existing ball-mount shank tongues and carrier inserts, and not require modifications to existing equipment. Such a device would preferably, be easily added to receiver hitch style article carriers, tool mounts, and work platforms at the time of manufacture.

U.S. Pat. No. 4,856,686, issued to Larry Workentine, describes an article carrier that can be attached to a ball-mount shank tongue to permit towing and carrying at the same time. However, no provision is disclosed for eliminating undesired free-play between the ball-mount shank tongue insert and a receiver hitch tube.

U.S. Pat. No. 5,593,172, issued to Patrick W. Bristlin, describes a receiver hitch anti-rattle device for ball-mount shank tongues. A disadvantage of this device is that it can loosen during heavy loads when subjected to repetitive towing maneuvers such as turns, starting, stopping, and backing up. A sports carrier would wobble from side to side during a tow and carry situation.

U.S. Pat. No. 4,050,714, issued to Walter H. Epp, describes a trailer hitch attachment that slips over the ball-mount shank tongue before it is inserted into the receiver tube end. After the locking clevis pin is inserted, a pair of adjusting bolts are used to press the ball-mount shank tongue aft in its connection and to load the locking clevis pin. The ball-mount shank tongue can thereby be locked tightly in the receiver tube by adjusting two bolts to eliminate all wobble. Unfortunately, very few standard ball-mount shank tongues have the necessary bosses that the collar plates could bear on, and the design generally is suited for weight-distributing type hitches.

U.S. Pat. No. 5,333,888, issued to Ball, and U.S. Pat. No. 5,224,133, issued to Abbott, et al., describe a sliding wedge type receiver hitch insert, but ball-mount shank tongues and article carriers already in use could not practically be retrofitted to incorporate these mechanisms.

U.S. Pat. No. 5,344,175, issued to Speer describes a mechanism for eliminating movement in trailer hitch receivers. However, it is not sufficiently sturdy for use in heavy towing operations nor could it be practically incorporated into existing ball mounts or article carrier inserts.

U.S. Pat. No. 5,615,904, issued to Van Dusen, et al.; U.S. Pat. No. 5,449,101, issued to Van Dusen; and U.S. Pat. No. 5,181,822, issued to Alisop, et al., all describe a screw means of pressing or pulling one sidewall of a sports carrier insert tightly against one sidewall of a receiver hitch tube to reduce undesired movement between ball-mount shank tongue and the receiver hitch tube. Unfortunately, such embodiments require the use of a modified hitch pin.

U.S. Pat. No. 5,664,717, issued to Brian K. Joder, and U.S. Pat. No. 5,529,231, issued to Ronald J. Burgess, each describe a side clamping piece on the receiver mounting insert that can be tightened against one side of the rim of the receiver tube after installing the locking clevis pin. Such a device is not expected to be entirely effective in eliminating wobble when heavy loading and twisting forces are applied to the hitch assembly, e.g., during trailer towing.

SUMMARY OF THE PRESENT INVENTION

It is therefore an object of the present invention to provide a simple device to eliminate undesired movement between a ball-mount shank and its mating receiver hitch tube and thereby eliminate rattling and bumping noise during vehicle operation.

It is an object of the present invention to provide a simple device that will work with common ball-mount shank tongues of all major brands currently in use and will not require any modifications to the ball-mount shank tongue, receiver hitch tube or hitch pin.

It is another object of the present invention to provide a device that can be retrofit to most existing receiver hitch style article carriers to eliminate wobbling.

It is a further object of the present invention to provide a free-play and slack elimination device for receiver-type trailer hitches that is fail-safe and does not compromise the safety integrity.

Briefly, a receiver-type trailer hitch system embodiment of the present invention comprises a splint assembly with a pair of opposing clamps that simultaneously engage opposite sides of the outer surfaces of an open end of a hitch receiver tube and shank end of a trailer coupling adaptor after being locked into place with a clevis pin. The splint assembly is tightened with a pair of bolts in a vice-like assembly to bring the opposing clamps hard against the hitch receiver tube and the trailer coupling adaptor to eliminate wobble and free-play that would otherwise exist between them.

An advantage of the present invention is that a receiver-type trailer hitch system is provided that is quiet and eliminates wobbling.

Another advantage of the present invention is that a trailer hitch splint is provided that can be retrofitted to existing receiver-type trailer hitch systems to quiet and eliminate wobbling between the receiver tube and the ball-mount shank.

These and other objects and advantages of the present invention will no doubt become obvious to those of ordinary skill in the art after having read the following detailed description of the preferred embodiment. which is illustrated in the drawing figures.

IN THE DRAWINGS

FIG. 1 is a perspective exploded assembly diagram of a first receiver-type trailer hitch system embodiment of the present invention in which a splint assembly has two bolts that pass around a receiver adaptor shank; and FIG. 2 is a perspective exploded assembly diagram of a second receiver-type trailer hitch system embodiment of the present invention in which a splint assembly has two bolts that pass through a receiver adaptor shank system and thereby prepositions and retains the splint.

DETAILED DESCRIPTION OF THE PREFERRED EMBODIMENT

Figure 1:
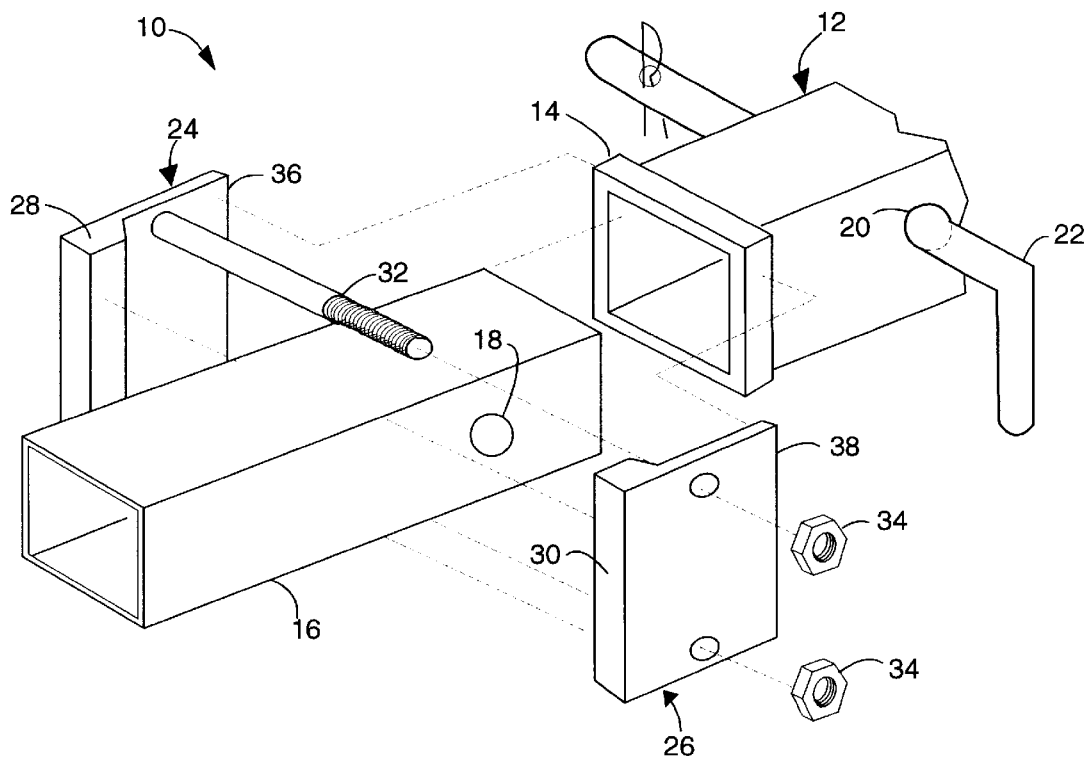

FIG. 1 illustrates a receiver-type trailer hitch system embodiment of the present invention, referred to herein by the general reference numeral 10. The trailer hitch system 10 comprises a towing-vehicle receiver tube 12 with an aft open-end collar 14. During use, a receiver adaptor shank 16 is inserted into the towing-vehicle receiver tube 12 through the aft open-end collar 14 up to the point that a hole 18 aligns with a hole 20 and a clevis pin 22 can be passed through to lock the assemblies together. Such assemblies thus locked together will have some amount of wobble and free-play between them which is taken up by a splint assembly that includes a pair of opposing clamp plates 24 and 26. A ridge 28 and 30 is included in each of the opposing clamp plates 24 and 26 that is intended to bear hard on the corresponding outside surfaces of the receiver adaptor shank 16 when a pair of carriage bolts 32 and nuts 34 are tightened. (The lower carriage bolt 32 in FIG. 1 is obscured by the receiver adaptor shank 16.) A forward lip 36 and 38 is also included on the front edge of each of the opposing clamp plates 24 and 26 that is intended to bear hard on the corresponding outside surfaces of the aft open-end collar 14 when the pair of carriage bolts 32 and nuts 34 are tightened. The trailer hitch system 10 therefore provides for the carriage bolts 32 to pass above and below the receiver adaptor shank 16, and thus provides for the splint assembly to be added as an after market item to an otherwise standard receiver type trailer hitch.

Figure 2:
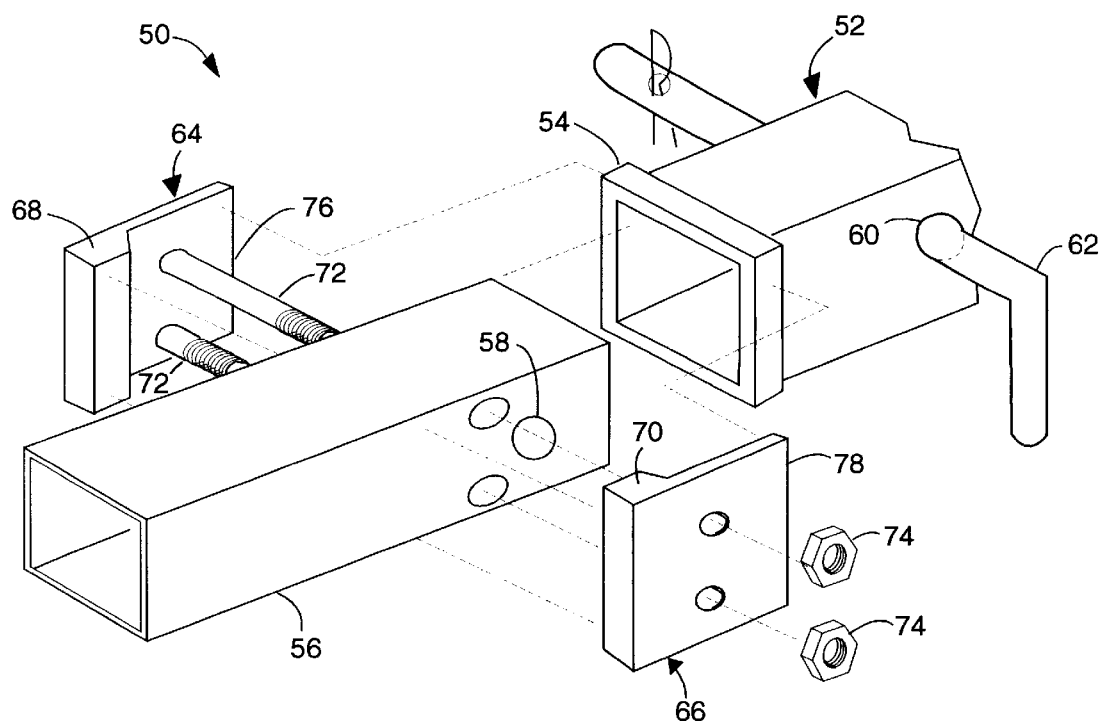

FIG. 2 illustrates a receiver-type trailer hitch system embodiment of the present invention, referred to herein by the general reference numeral 50. The trailer hitch system 50 is similar to that shown in FIG. 1 and comprises a towing-vehicle receiver tube 52 with an aft open-eind collar 54. During use, a receiver adaptor shank 56 is inserted into the towing-vehicle receiver tube 52 through the aft open-end collar 54 up to the point that a hole 58 aligns with a hole 60 and a clevis pin 62 can be passed through to lock the assemblies together. Such assemblies locked together in this way will have some amount of wobble and free-play between them. The looseness is taken up by a splint assembly that includes a pair of opposing clamp plates 64 and 66. A ridge 68 and 70 is included in each of the opposing clamp plates 64 and 66 that is intended to bear hard on the corresponding outside surfaces of the receiver adaptor shank 56 when a pair of carriage bolts 72 and nuts 74 are tightened. A forward lip 76 and 78 is also included on the front edge of each of the opposing clamp plates 64 and 66 that is intended to bear hard on the corresponding outside surfaces of the aft openend collar 54 when the pair of carriage bolts 72 and nuts 74 are tightened. The trailer hitch system 50 provides for the carriage bolts 72 to pass through the receiver adaptor shank 56, and thus helping preposition and retain the splint assembly on an otherwise standard receiver type trailer hitch.

The side plates 24, 26 and 64, 66 are preferably oriented to the vertical. The receiver adaptor shanks 16 and 56 may comprise typical ball-mount tongue shanks that are telescoped into receiver hitch tubes 12 and 52 and clevis hitch pins 22 and 62 are inserted and secured. The pair of device side plates 24, 26 and 64, 66, and carriage bolts 32 and 72 with hex nuts 34 and 74 threaded thereon, are slid forward as a unit until the pair of device side plates 24, 26 and 64, 66 lap over the end of receiver hitch tubes 12 and 52 and the carriage bolts 32 and 72 just touch the collars 14 and 54. The hex nuts 34 and 74 are then preferably evenly and fully tightened. Such tightening causes the ridges 28, 30 and 68, 70 to be pressed against the full width of two opposed outside walls of ball-mount tongue shank 16 and 56 while the forward lips 36, 38 and 76, 78 are tightly pressed against the outside of the ends of the receiver hitch tubes 12 and 52.

In the United States, the great majority of receiver style hitches are two-inch and one inch-and-a-quarter sizes. Preferably, the ridges 28, 30 and 68, 70 have rises of 0.500 inches for use on two-inch receiver hitches, and rises of 0.375 inches for use on one inch-and-a-quarter receiver hitches. The reason for this is that the commercial hitch industry's standard outside dimension for collars 14 and 54 is about 3.000 inches for a two-inch receiver hitch, and 2.000 inches for a one inch-and-a-quarter receiver hitch. The rise of ridges 28, 30 and 68, 70 is preferably such that the device side plates 24, 26 and 64, 66 will be essentially parallel after the hex nuts 34 and 74 are evenly and fully tightened. This will then maximize the side-plate surface contact with both the ball-mount shanks and the hitch receiver tubes.

Preferred embodiment of FIG. 2 would typically be incorporated into new article carriers, tool mounts and work platforms when they are manufactured. In this embodiment, the receiver adapter shank is equipped with paired through holes spaced to match corresponding holes in device side plates 24, 26 and 64, 66 and sized to receive carriage bolts 32 and 72. The advantage of this is that the device side plates 24, 26 and 64, 66 can be made somewhat smaller and will also be retained on the insert when the hex nuts 34 and 74 are loosened and the carrier, tool mount, or work platform removed for storage during a non-use period. This prevents the invention device from becoming separated from the receiver adapter shank and easily lost or misplaced. The paired through holes and hitch pin holes would preferably be spaced in a series so as to permit different selections of carrier-to-vehicle hitch spacing when installing the carrier in a receiver tube.

The device side plates 24, 26 and 64, 66 are preferably made of a tough metal alloy such as steel. For example, they may be manufactured from readily available flat sheet mild carbon steel or formed from a die in a metal stamping or metal casting process. Though not necessary, they may include irregularities such as ridges, depressions, dimples, or bumps to enhance strength or to direct the location of surface contact to a specific location. A partial or full inner layer portion of a very dense elastomeric material such as carbon rubber might also be used to improve surface contact friction and dampening.

While the carriage bolts 32 and 72 and hex nuts 34 and 74 were selected for preferred embodiments, it is readily apparent that the use of other ways and means such as handles; knobs; cam action fasteners; welding on studs; threading holes in device side plates 24, 26 and 64, 66; welding threaded fasteners to device side plates 24, 26 and 64, 66; and threading paired through holes in the receiver adapter shank may be used in part or combination to reduce or eliminate the need for tools to install the invention device or to make installation easier. These various means function equally well so long as the opposed pair of device side plates 24, 26 and 64, 66 are held in firm surface friction contact with the corresponding sides of the receiver adapter shank and receiver tube combination and have releasable means.

There are four relative motions of the shank 16 and 56 within the receiver tube combination to be countered by the splinting action of the invention device. These are lateral axis, vertical axis, fore and aft sliding, and rotation motion about the longitudinal axis of shank 16 and 56. Lateral axis motion, that is up and down movement of shank 16 and 56 at the aft end is not of significant concern because the weight of the load holds down the shank 16 and 56. When driving with an unloaded carrier or with only a ball-mount shank tongue installed in a receiver tube, vehicle suspension and dampening action provided by surface contact friction between the installed invention device, shank 16 and 56, and receiver tube 12 and 52 are sufficient to prevent rattling or bumping noise.

Vertical axis motion, that is when the shank 16 and 56 tends to slide from side to side in receiver tube 12 and 52 as during turns while towing is not a significant problem. As with lateral axis motion, dampening action provided by the invention device is sufficient to prevent rattling or bumping. Vertical axis motion has only a negligible affect on article carrier wobble.

Fore and aft sliding motion of the shank 16 and 56 usually only occurs during startups and stops while towing an object. This motion is a negligible contributor to article carrier wobble during a tow and carry situation. The invention device dampens this motion and reduces the bumping noise produced when the ball-mount shank tongue alternately and suddenly applies a pushing or pulling force on the clevis hitch pins 22 and 62 that is inserted through receiver tube 12 and 52 and shank 16 and 56.

Rotation motion of the shank 16 and 56 about its longitudinal axis, even a very slight amount, is very detrimental and of most concern. This motion is the root cause of cargo carrier wobble during vehicle movement. Such wobble motion increases as the carrier's load is increasingly spaced from the insert and is particularly objectionable in tow and carry situations because carrier loads in this configuration are usually spaced higher than normal over the shank 16 and 56 in order to provide better towing clearance. The invention device essentially eliminates all relative rotation motion between the insert and the receiver about their longitudinal axis.

As can be appreciated, the invention device eliminates or greatly reduces all free-play in a receiver hitch tube and shank 16 and 56 combination. The preferred embodiment can be used with virtually all ball-mount shank tongues currently in use as well as with article carriers, tool mounts, and work platforms as a first or improved anti-wobble device. Also by simply utilizing different thickness of device side plates 24, 26 and 64, 66 and different sizes of carriage bolts 32 and 72 and hex nuts 34 and 74, the invention device can be manufactured with different capacity ratings to reduce manufacturing and distribution costs, and to more suitably match the device to its intended use, such as for heavy towing operations or for small article carriers.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An accessory for a receiver-type trailer hitch, comprising:
    a pair of opposing clamp plates (24, 26) each having a forward lip (36, 38) in a segment of a first thickness and adapted for engaging an open-ended collar (14) of a trailer hitch receiving tube (12) and an aft ridge (28, 30) of a second thickness that is greater than said first thickness adapted for engaging an outer shank surface of a trailer coupling adapter (16) inserted into said trailer hitch receiving tube (12);
    a pair of matching bolt holes in each of the pair of opposing clamp plates (24, 26) and located on each plate between said forward lip (36, 38) and said aft ridge (28, 30); and
    a pair of bolts (32) extending through holes in said segment of first thickness adapted for passing on either side of said trailer coupling adapter (16) and through said pair of matching bolt holes and that are provided with nuts (34) adapted to be tightened to draw the pair of opposing clamp plates (24, 26) together;
    wherein, said respective forward lips (36, 38) of the pair of opposing clamp plates (24, 26) are for providing a clamping of said open-ended collar (14) of said trailer-hitch receiving tube (12), and said respective aft ridges (28, 30) of the pair of opposing clamp plates (24, 26) are for providing a clamping of said outer shank surface of said trailer coupling, adaptor (16) inserted into said trailer-hitch receiving tube (12); and
    wherein, the pair of opposing clamp plates (24, 26) are for preventing wobbling and rattling between said trailer coupling adaptor (16) inside said trailer hitch receiving tube (12) by forming a splint.

2. An accessory for a receiver-type trailer hitch and trailer coupling adapter combination, said accessory comprising:
    a pair of opposing clamp plates (24, 26) each having a forward lip (36, 38) in a segment of a first thickness aid about one terminal end; and an aft ridge (28, 30) of a second thickness that is greater than said first thickness and about another terminal end for bridging opposing exterior side walls of a trailer hitch receiving tube (12) and corresponding opposing exterior side walls of a trailer coupling adapter (16) when said trailer coupling adapter (16) is inserted into said trailer hitch receiving tube (12) each of said aft ridges (28, 30) projecting laterally from a planar surface of said plates and adapted for interfacing with a surface of said trailer coupling adapter (16);

a pair of matching bolt holes in each of the said pair of opposing clamp plates (24, 26) and located on each plate between said forward lip (36, 38) and said aft ridge (28, 30); and a pair of bolts (32) extending through holes in said segment of first thickness adapted for passing adjacent to either side of said trailer coupling adapter (16), behind die rearward end of said trailer hitch receiving tube (12) and through said pair of matching bolt holes, each of the bolts (32) are provided with nuts (34) adapted to be tightened to draw said pair of opposing clamp plates (24, 26) together;

wherein, said respective forward lips (36, 38) are for engaging opposing exterior side walls of said trailer hitch receiving tube (12) and said respective aft ridges (28, 30) are for transversely engaging corresponding opposing exterior side walls of said trailer coupling adapter (16) with said clamp plates (24, 26) to form a bridge between said receiving tube (12) and coupling adapter (16) with said coupling adapter (16) inserted into said trailer hitch receiving tube (12), and with said pair of bolts (32) inserted through matching holes in said pair of opposing clamp plates (24, 26) in cooperation with said nuts (34) with said nuts (34) tightened to squeeze said pair of opposing clamp plates (24, 26) together with said respective forward lips (36, 38) pressed against opposing exterior side walls of said trailer hitch receiving tube (12) and said respective aft ridges (28, 30) pressed against corresponding opposing exterior side walls of said trailer coupling adapter (16) thereby fixedly bridging said hitch receiving tube (12) and trailer coupling adapter (16) and preventing relative movement.

3. A receiver-type trailer hitch, comprising:

a hitch receiver tube for mounting to a towing vehicle and providing an open end to receive a plurality of trailer coupling adaptors;

a trailer coupling adaptor having a shank end insertable into said open end of the hitch receiver tube that is locked in place with a clevis pin; and a splint assembly having a pair of opposing clamps that simultaneously engage opposite sides of the outer surfaces of both said open end of the hitch receiver tube and said shank end of the trailer coupling adaptor when locked into place with said clevis pin;

wherein, the splint assembly comprises a pair of bolts with nuts that pass through said shank end of the trailer coupling adaptor between said opposing clamps and that permit the vice assembly to be held in place by said shank end of the trailer coupling adaptor prior to being inserted into the hitch receiver tube; and wherein, the splint assembly is tightened to cause said opposing clamps to eliminate wobble and free-play that would otherwise exist between the hitch receiver tube and the trailer coupling adaptor.

4. An improved receiver-type trailer hitch with a hitch receiver tube for mounting to a towing vehicle and providing an open end to receive a plurality of trailer coupling adaptors, and a trailer coupling adaptor having a shank end insertable into said open end of the hitch receiver tube that is locked in place with a clevis pin, the improvement comprising:

said pair of opposing clamps are vertically oriented such that they laterally squeeze the hitch receiver tube and the trailer coupling adaptor between.

5. An improved receiver-type trailer hitch with a hitch receiver tube for mounting to a towing vehicle and providing an open end to receive a plurality of trailer coupling adaptors, and a trailer coupling adaptor having a shank end insertable into said open end of the hitch receiver tube that is locked in place with a clevis pin, the improvement comprising:

a splint assembly having a pair of opposing clamps that simultaneously engage opposite sides of the outer surfaces of both said open end of the hitch receiver tube and said shank end of the trailer coupling adaptor when locked into place with said clevis pin;

wherein, the splint assembly is tightened to cause said opposing clamps to eliminate wobble and free-play that would otherwise exist between the hitch receiver tube and the trailer coupling adaptor; and wherein, said pair of opposing clamps are oriented such that they squeeze the hitch receiver tube and the trailer coupling adaptor in parallel between to improve splinting surface area contact.

\* \* \* \* \*